Sept. 20, 1955   B. C. BRADSHAW ET AL   2,718,539
SOLID STATE BATTERY
Filed Oct. 4, 1954
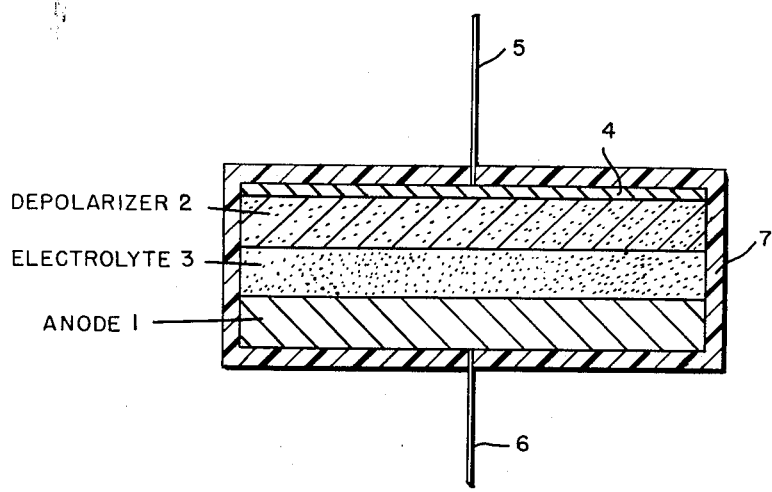
INVENTOR.
BENJAMIN C. BRADSHAW
BY ROSE A. SHUTTLEWORTH
Harry M. Saragovitz
ATTORNEY United States Patent Office 2,718,539
Patented Sept. 20, 1955

2,718,539

SOLID STATE BATTERY

Benjamin C. Bradshaw, Long Branch, and Rose A. Shuttleworth, Matawan, N. J., assignors to the United States of America as represented by the Secretary of the Army Application October 4, 1954, Serial No. 460,283

5 Claims. (Cl. 136—83)

(Granted under Title 35, U. S. Code (1952), sec. 266)

The invention described herein may be manufactured and used by or for the Government for governmental purposes without the payment of any royalty thereon.

This invention relates to primary batteries having a solid crystalline electrolyte between and in contact with the electrodes. A solid crystalline electrolyte must be ionically conductive but electronically nonconductive.

It has already been proposed (U. S. Patent 2,689,876) to utilize silver halides as such solid crystalline electrolytes in combination with silver as the negative electrode and sulfur as the positive electrode. It has also been proposed to construct a cell using silver as the negative electrode, silver iodide as the crystalline electrolyte and iodine, preferably in mixture with carbon, as the positive electrode (U. S. Patent 2,690,465). Such a cell may, for instance, comprise a sheet of silver having on one surface a silver iodide layer constituting the solid electrolyte, which solid electrolyte is in contact with the positive electrode which itself consists of a mixture of iodine and carbon.

We now have found that a number of systems may be used with great advantages for the construction of such "solid state" cells and batteries made from such cells. Briefly stated, the new cells comprise a negative electrode of either magnesium or aluminum, a crystalline solid state electrolyte consisting of the salts of magnesium, potassium or potassium admixed with aluminum, and a positive depolarizer electrode consisting of one of the conventional depolarizing materials in mixture with one of the salts of magnesium and potassium mentioned above which are acting as solid state electrolytes.

The invention will become more apparent from the following description of specific embodiments taken in connection with the accompanying drawing which represents a cell using the above-mentioned systems.

The cell shown in the drawing is greatly enlarged and consists of a negative metal film electrode 1, a thin, flat depolarizer anode 2, and a thin layer of a solid crystalline electrolyte 3. A thin conductive plate 4 consisting of a metal inert to the action of the depolarizer (e. g., platinum or gold) establishes contact between the depolarizer electrode 2 and the cathode terminal 5 while the anode terminal 6 is directly connected to the metal film electrode 1. A cell container 7 consisting, for instance, of polystyrene, vinyl polymers, or other insulating material incloses the cell elements.

The following cells were made and have proved to give very satisfactory results:

(a) Magnesium as the negative electrode, magnesium nitrate—$(MgNO_3)_2.6H_2O$—as the solid electrolyte, and a mixture of said magnesium nitrate with lead peroxide as the depolarizer material. This cell shows a voltage of 2.1 volts.

(b) Magnesium as the negative electrode, magnesium sulfate—$MgSO_4.7H_2O$—as the solid electrolyte, and a mixture of said magnesium sulfate with lead peroxide as the depolarizer material. Like the first mentioned cell this cell too shows a voltage of 2.1 volts.

(c) Magnesium as the negative electrode, potassium fluoride—$KF.2H_2O$—as the solid electrolyte, and a mixture of said potassium fluoride and lead peroxide as the depolarizer material. This cell shows a voltage of 2.6 to 1.3 volts.

(d) Aluminum as the negative electrode, potassium aluminum sulfate—$KAl(SO_4)_2.12H_2O$—as the solid electrolyte, and a mixture of said potassium aluminum sulfate with lead peroxide as the depolarizer material. This cell shows a voltage of 1.5.

The outstanding advantages of these new systems lie in their use for the manufacture of miniaturized wafer type cells, or pile type batteries of high electrical potential made from such wafer type cells. Miniaturized wafer type cells using the above-described systems may be constructed in various ways. The following example is illustrative:

To manufacture a wafer type cell using the system: magnesium/magnesium nitrate/lead peroxide-magnesium nitrate, a disc of magnesium of about 1 mm. in thickness is cut to fit the die of an hydraulic press of say 1 cm. in diameter. This magnesium disc is placed in the die of the hydraulic press and a thin layer of finely powdered magnesium nitrate is spread uniformly over the surface of the magnesium disc to form a continuous film of about 0.1 mm. thickness. This film of magnesium nitrate acts as the electrolyte. A mixture of magnesium nitrate and lead peroxide is then finely ground and thoroughly mixed and placed over the film of magnesium nitrate so as to form a second continuous film. This second film constitutes the depolarized electrode. A very thin sheet of platinum or gold or of other inert metals is placed over this depolarizer film and the assembly is subjected in the hydraulic press to a pressure of about $10^4$ kg. per cm.$^2$.

To provide high voltage miniature pile type batteries any number of cells made as described above or in any other way, may be stacked in well known manner and the stack may then be inclosed in a tube of glass, polystyrene or similar insulating materials. The stack may also be encased in a suitable potting compound such as an epoxy resin or the like.

The cells made according to the present invention give currents of the order of $10^{-7}$ amperes with a fall of not more than 0.01 to 0.02 volt when placed in series with about 10 megohms.

The solid state cells and batteries according to the invention may be used wherever the operating conditions require a sizeable voltage with low current and the power demands are small as, for instance, in some of the new solid state devices. If properly hermetized the cells according to the invention may, for example, be used as grid biases for transistorized triodes.

It will be obvious to those skilled in the art that many variations and combinations are conceivable within the scope of the inventive idea as characterized in the accompanying claims.

What is claimed is:

1. A solid state primary battery, each of the cells therein comprising a negative electrode selected from the group consisting of magnesium and aluminum; a crystalline solid state electrolyte having ionic conductivity and being electronically nonconductive selected from the group consisting of salts of magnesium, potassium and potassium admixed with aluminum; and a depolarizer electrode consisting of a depolarizing material in mixture with said selected salt.

2. A solid state primary battery according to claim 1, each of the cells therein comprising a negative electrode consisting of magnesium, an electrolyte consisting of magnesium nitrate and a depolarizer electrode consisting of a mixture of lead peroxide and magnesium nitrate.

3. A solid state primary battery according to claim 1, each of the cells therein comprising a negative electrode consisting of magnesium, an electrolyte consisting of magnesium sulfate and a depolarizer electrode consisting of a mixture of magnesium sulfate and lead peroxide.

4. A solid state primary battery according to claim 1, each of the cells therein comprising a negative electrode consisting of magnesium, an electrolyte consisting of potassium fluoride and a depolarizer electrode consisting of a mixture of lead peroxide and potassium fluoride.

5. A solid state primary battery according to claim 1, each of the cells therein comprising a negative electrode consisting of aluminum, an electrolyte consisting of potassium aluminum sulfate and a depolarizer electrode consisting of a mixture of lead peroxide and potassium aluminum sulfate.

References Cited in the file of this patent

UNITED STATES PATENTS

| | | |
|---|---|---|
| 2,689,876 | Lehovec | Sept. 21, 1954 |
| 2,690,465 | Broder | Sept. 28, 1954 |
| 2,696,513 | Lehovec | Dec. 7, 1954 |